tion of the flowing water.

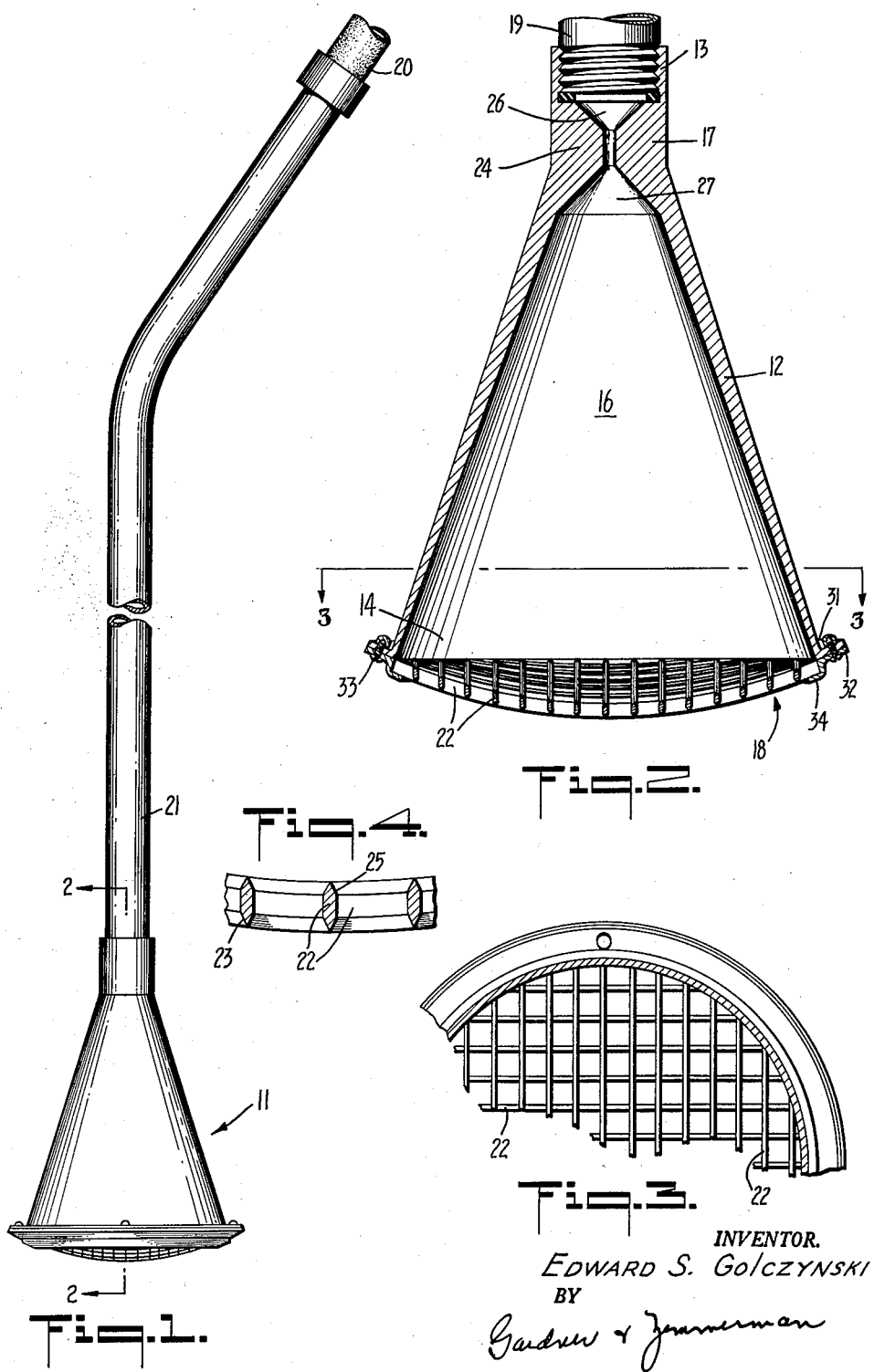

United States Patent Office 3,085,329
Patented Apr. 16, 1963

3,085,329
DIFFUSING AND DISPERSING SPRAY DEVICE
Edward S. Golczynski, 458 Berry Ave., Hayward, Calif.
Filed Aug. 7, 1961, Ser. No. 129,824
5 Claims. (Cl. 30—123.3)

This invention relates to means for disposing of stools or other excrement of dogs or the like, and more particularly relates to a device for dissecting the stool into many particles and dispersing them into the lawn or other ground on which the stool was deposited.

When the stools of a dog are left on a lawn there is a problem with regard to the removal of such excrement without causing damage to the lawn. The use of a shovel or the like in an attempt to scoop up the waste matter tends to either leave a substantial portion of the substance on the lawn or to dig into the lawn thereby injuring it. Note also that the smeared portion of the excrement remaining after an ineffectual attempt to scoop it off can often cause injury to the lawn by burning or drying it out.

Thus it is accordingly a primary object of the invention to provide means for effectively disposing of a stool or the like after having been deposited on a lawn or other ground surface, while avoiding injury to such lawn or ground from the disposal operation.

It is another object of the invention to provide a device for disposing of stools or the like by dissecting the stools into many particles and dispersing them into the lawn or other ground on which the stool was deposited.

A further object is to provide a device of the character described which can be simply attached to a garden hose or the like for effective disposal of stools deposited on a lawn or similar ground.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a side view of a preferred embodiment of the present invention.

FIGURE 2 is a cross sectional view taken through the plane 2—2 shown in FIGURE 1.

FIGURE 3 is a cross-sectional view taken through the plane 3—3 shown in FIGURE 2; and FIGURE 4 is an enlarged portional view of the screen member.

To accomplish the aforementioned objects, the present invention provides a diffusing and dispersing spray device designated in the drawings by the numeral 11. As best seen in FIGURE 2, the device 11 comprises a body member 12 having an inlet end 13, an outlet end 14, and a fluid passage 16 diverging in shape from the inlet end towards the outlet end. A nozzle 17 is disposed adjacent the inlet end 13, and is adapted to create a divergent spray of fluid into the passage 16, there being additionally provided a rigid screen 18 or the like disposed over the end 14 and secured to the body member 12 for a purpose presently to be explained.

Preferably, the body 12 is adapted with a threaded inner bore 19 adjacent the inlet end 13 for coupling the device 11 to a source of fluid, for example a common garden hose 20. In addition, it is advantageous to have a tubular rigid extension arm 21 coupled to the device 11 adjacent the inlet end 13 and to an end of hose 20 to facilitate easy handling of the same.

In order to dispose of dog stools or the like, a person grasps the upper portion of the extension arm 21 and then manipulates the device 11 to depress the screen 18 into the accumulated pile of excrement. By repeatedly chopping into the pile, while water is flowing through the device, the pile is divided into small pieces which are continually washed away by the spray of water. It will be appreciated that in the form of small particles the stools are readily assimilated into the lawn or ground with no injury thereto. Note also that the water spray serves to aid in the process of breaking up the stool where it has been allowed to dry out.

With more particular regard now to the screen 18, and as an important feature of this invention, attention is directed towards FIGURES 3 and 4 wherein the screen is seen to comprise a plurality of interconnected grid members 22. Since the screen must withstand the downward forces of the chopping action it is important that sufficient rigidity be provided thereto, and to this end it is preferable that the grid members each comprise slats formed out of metal, plastic or other suitable material. If the grid members are spaced too closely together, the spacing therebetween will tend to clog with foreign material. I have found that a spacing between the grid members of about one quarter inch will produce a good cutting action on the stools, while permitting the water to flush out the material between the grids. An additional advantage is afforded by adapting the outwardly exposed edges of the grid members with knife edges 23, as is best observed in FIGURE 4 whereby the stool is more readily dissected upon depression of the screen, and to likewise provide the innermost edges of the grid members with a corresponding knife edge 25 to assist in the purging action of the flowing water.

By providing the screen 18 in a convex shape, as shown in the drawings, other advantages are provided, for example the aforementioned rigidity is enhanced with respect to forces from a downward impact of the screen on the ground. Furthermore, the device 11 may be rocked back and forth while depressed downwardly on the stool to aid in the chopping action and to allow the dissected particles to be washed away from under the screen. The height of the grid members is preferably in the range of about one-eighth of an inch which provides sufficient rigidity therefor during use.

As concerns the nozzle 17, it is preferable that it be constructed substantially according to conventional venturi design. More particularly, the nozzle comprises a substantially annular restriction member 24 secured adjacent the inlet end 13 and which defines two passages 26 and 27 respectively diverging towards the inlet and outlet ends of the body member 12. The passage 27 is placed in fluid communication with the passage 16, as well as with the other passage 26. Preferably, the nozzle 17 is adapted to create a divergent spray having a substantially greater concentration of force along the axis of passage 16 as opposed to along the walls of the body member 12. In this manner the spray can be utilized to maximum advantage with regard to disposing of the stool from the force of the water.

The screen 18 may be releasably secured to the body 12 adjacent the flared outlet 14 thereof such as by providing a flange 31 on the body. A retainer having a corresponding flange 32 is secured to flange 32 by screws 33. Flange 32 has an inturned lip 34 underlying and engaging the screen member for retaining the same in position.

What is claimed is:

1. A device of the character described comprising, in combination, a body member having an inlet end, an outlet end substantially larger than said inlet end, and a passage diverging from said inlet end towards said outlet end, a generally annular restriction member secured within said passage adjacent said inlet end, and a screen disposed over said outlet end, said screen including a plurality of interconnected grid members each having an outwardly exposed knife edge tapered to a thickness less than that of the medial grid member portion.

2. A device according to claim 1, further defined by said screen having a generally convex shape.

3. A device according to claim 2, further defined by an extension arm secured to said body member with said arm having a passageway therethrough placed in communication with said passage of said body member adjacent said inlet end.

4. A device as set forth in claim 1 in which said grid members are provided with inwardly exposed knife edges.

5. A device as set forth in claim 1 in which said grid members are spaced approximately one-quarter inch from each other.

References Cited in the file of this patent

UNITED STATES PATENTS

| | | |
|---|---|---|
| 871,003 | Teall | Nov. 12, 1907 |
| 2,492,037 | Freeman et al. | Dec. 20, 1949 |
| 2,558,238 | Collins | June 26, 1951 |